Sept. 10, 1929.　　　B. D. RITHOLZ　　　1,727,411
EYE TESTING DEVICE
Filed May 13, 1927
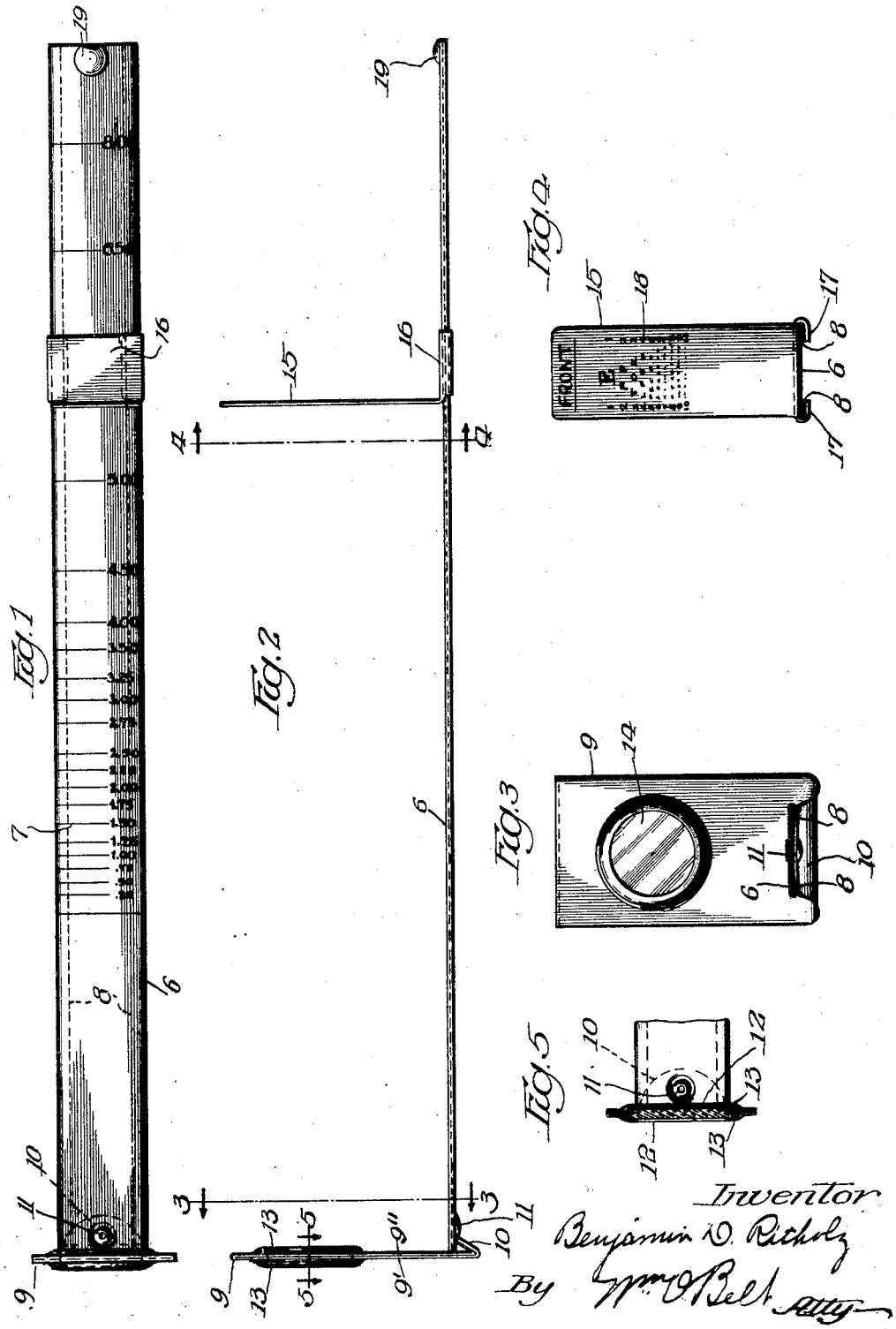

Patented Sept. 10, 1929.

1,727,411

UNITED STATES PATENT OFFICE.

BENJAMIN D. RITHOLZ, OF CHICAGO, ILLINOIS, ASSIGNOR TO NATIONAL WATCH & JEWELRY CO., OF CHICAGO, ILLINOIS, A CORPORATION OF ILLINOIS.

EYE-TESTING DEVICE.

Application filed May 13, 1927. Serial No. 191,021.

This invention relates to eye testing devices and its object is to provide a novel device of simple but strong and substantial construction which can be easily operated for testing eyes so that any individual may determine the information necessary to enable an optician to make the proper lenses for correcting defects of sight.

And a further object of the invention is to provide a metal eye testing device of compact form which is adapted for transmission through the mails and which can be produced at relatively low cost so that it can be furnished without charge to individuals for testing their own eyes and which will stand repeated shipments to different individuals without becoming disabled for accurate use.

In the accompanying drawings illustrating the invention:

Fig. 1 is a top plan view.
Fig. 2 is a side elevation.
Fig. 3 is a sectional view on the line 3—3 of Fig. 2.
Fig. 4 is a sectional view on the line 4—4 of Fig. 2.
Fig. 5 is a transverse sectional view through the eye member on the line 5—5 of Fig. 2.

Referring to the drawings, 6 is a slide or scale bar provided on its top face with a scale 7 graduated by lines and figures. This bar consists of a long metal strip having its side edges bent over and against its bottom face, as shown at 8 to reinforce and strengthen the strip.

The eye member 9 is rigidly mounted on one end of the slide bar and it consists of a strip of sheet metal bent upon itself to form a double thickness, its lower end 10 being reduced in width and bent upward under the end of the slide bar to which it is rigidly secured by a rivet 11 or other suitable fastening means. The two parts 9′, 9″ formed by folding the metal strip upon itself to produce the eye piece are provided with registered openings 12 and the marginal edges of these openings are flanged outward at 13 to form a frame in which the lens 14 is seated. The end of the slide bar is squared to fit against the eye member and the fastening rivet holds the parts rigidly together and the eye member and the slide bar in proper position with relation to each other.

The chart member 15 consists of a metal strip which is bent at right angles at the bottom to provide a guide 16 having bottom flanges 17 which embrace the side edge margins of the slide bar. The chart member projects upward from the top face of the slide bar parallel with the eye member and at right angles to the slide bar, and it is provided on the front thereof with a suitable eye chart 18 in alignment with the lens in the eye member. I have described the device as embodying a lens, but the lens may be omitted if desired. A projection 19 is stamped up on the top of the slide bar to retain the eye member thereon.

The invention provides a novel and simple eye testing device of strong and substantial construction which can be used by any individual for testing his eyes to ascertain such facts from the chart and the scale as may be necessary to enable an optician to provide proper lenses.

I claim:

1. An eye testing device comprising a slide bar, an eye member secured to one end of the slide bar, and a chart member slidably mounted on the slide bar and in parallel relation with the eye member, said slide bar consisting of a relatively thin and narrow elongated sheet metal strip having its side edges bent over and against its bottom face, and said chart member having a guide embracing said folded edges of the slide bar.

2. An eye testing device comprising a slide bar, an eye member positioned in front of one end of the slide bar, and a chart member slidably mounted on the slide bar and in parallel relation with the eye member, said chart member having a chart thereon, said eye member comprising a metal strip bent upon itself to form a double thickness and having an opening therein through which to view the chart, the lower end of said eye member extending below the end of the slide bar and being bent upward under the end of the slide bar, and means fastening the upbent end of the eye member to the underside of the slide bar.

3. An eye testing device made of sheet metal strips and comprising an elongated slide bar having its side edges bent over and against its bottom face, an eye member consisting of a metal strip doubled upon itself and provided with a lens opening, a frame about said opening, a lens in said frame, means securing said eye member to said slide bar at one end thereof with the slide bar abutting squarely against one face of the eye member, and a chart member bearing a chart and slidably mounted on the slide bar in parallel relation with the eye member, said chart member having a rearwardly disposed guide at its lower end engaging the slide bar.

BENJAMIN D. RITHOLZ.